Figure 1:
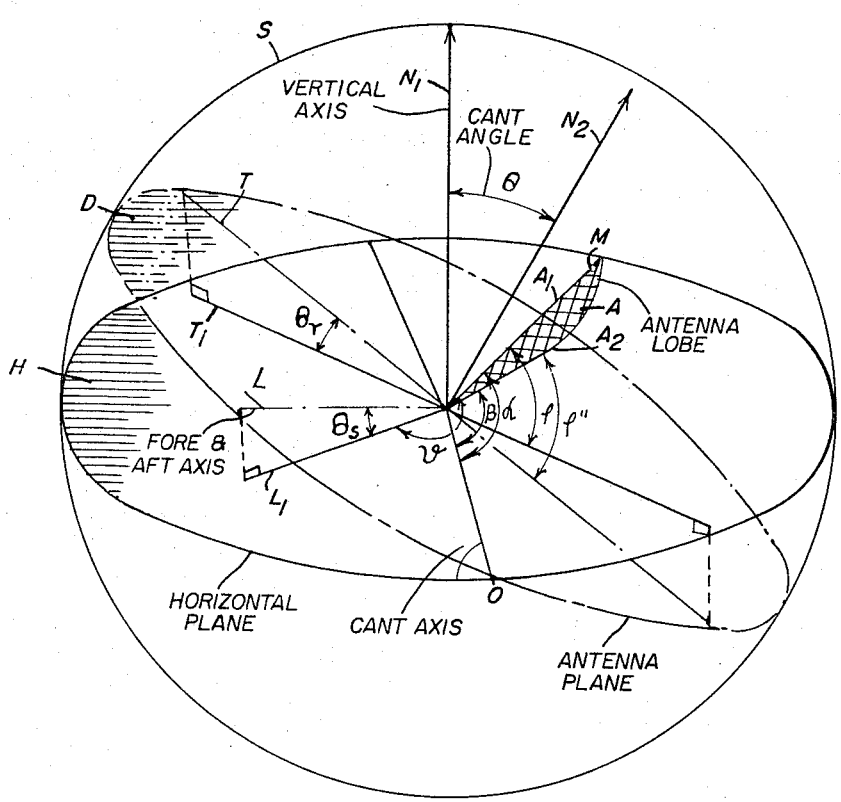

INVENTOR
*KARL GÖRAN FOLKE LIND*

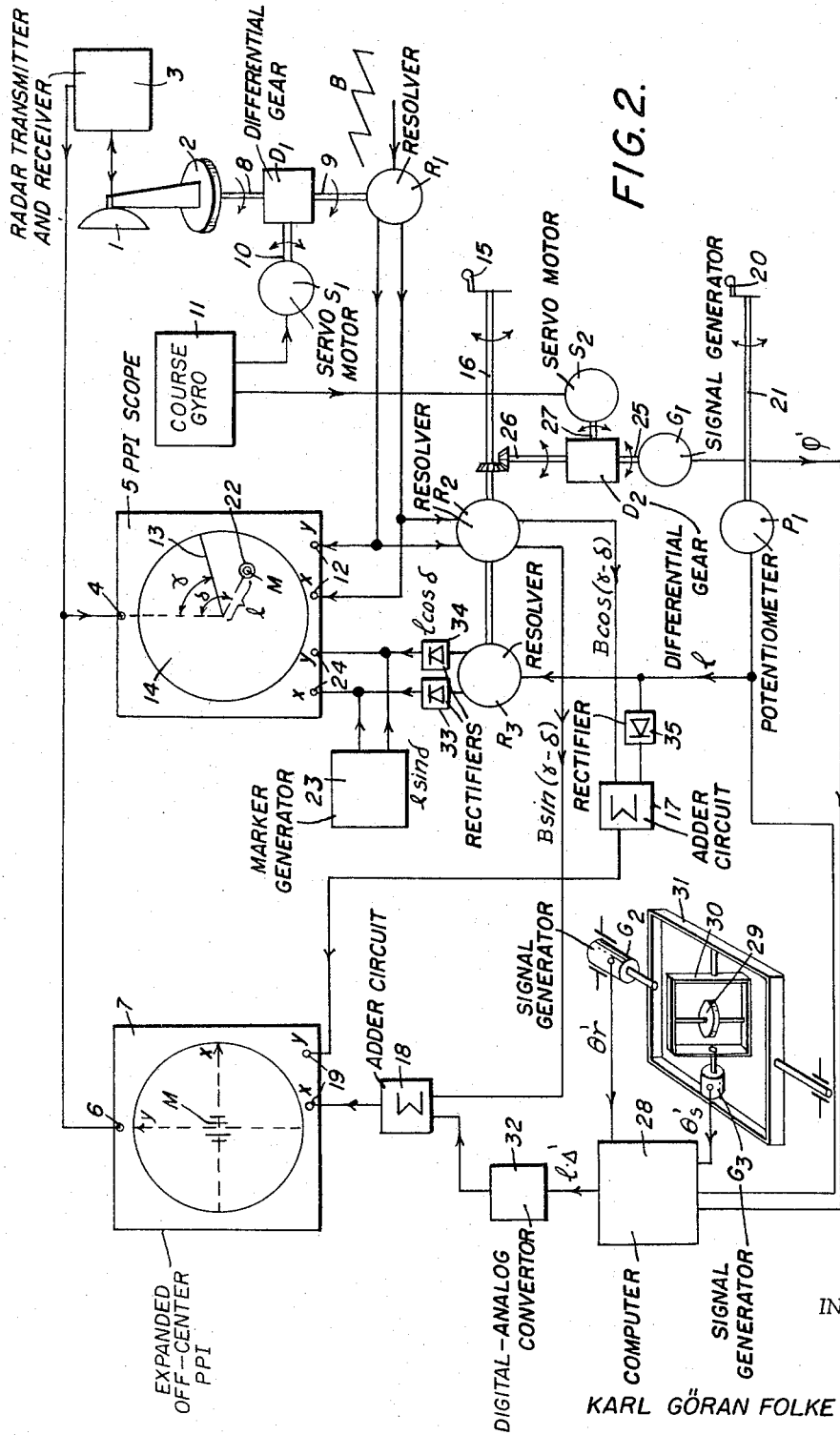

United States Patent Office 3,315,256
Patented Apr. 18, 1967

3,315,256
METHOD AND DEVICE IN A RADAR SYSTEM ON A SHIP FOR CORRECTING BEARING ERRORS CAUSED BY THE LURCHING MOVEMENTS OF THE SHIP
Karl Göran Folke Lind, Karlskoga, Sweden, assignor to Aktiebolaget Bofors, Bofors, Sweden, a corporation of Sweden
Filed June 11, 1964, Ser. No. 374,398
Claims priority, application Sweden, June 28, 1963, 7,246/63
15 Claims. (Cl. 343—11)

The present invention relates to search radar systems for use on board of ships, which systems are provided with equipment for selecting and tracking at least one surface target detected by such a system. A radar system of this type includes a radar antenna mounted on the ship. The antenna is continuously rotated through a substantial sector angle, generally through a complete turn, in a plane substantially horizontal when the ship is in the horizontal attitude. The system also includes a PPI scope for presentation of the total area scanned by the antenna and any echoes received from this area.

To make it possible to select and track a certain target detected within the total scanned area, the radar system is provided with an equipment for selecting a small cut-out section within the total area scanned by the antenna and for displaying this section, together with any echoes received therefrom, on a so-called expanded off-set-center PPI or the like (a means for displaying substantially orthogonal range and bearing coordinates) on an enlarged scale relative to the picture on the display screen of the PPI. This equipment comprises control means by means of which the cut-out section can be moved to any arbitrary position within the total scanned area. The actual position of the cut-out section within the total scanned area is normally indicated by means of a marker on the display screen of the PPI, which marker is moved in accordance with changes in the position of the cut-out section made by means of the control means. An operator, guided by the picture of the total scanned area on the display screen of the PPI and by the marker visible on this display screen, can thus, by means of the control means, display the cut-out section so that it will include a certain target which is to be tracked. The echo will then appear on the display screen of the offset-center PPI, and guided by the picture on the display screen of the offset-center PPI, the operator, by means of the control means, can now center the cut-out section on the selected target so that the echo from the target will lie in the center of the display screen of the offset-center PPI.

Subsequently the operator can bring the cut-out section to follow the target in its movement so that the echo from the target will remain in the center of the display screen of the offset-center PPI. The bearing and the range to the center of the cut-out section will then correspond to the bearing and the range to the selected target, and these quantities can be picked out from the control means determining the position of the cut-out section and be used, for instance, as input data in a fire control computer for a weapon which is to fire at the selected target. Consequently, by means of this target-tracking equipment, the search radar system can be used simultaneously as a fire control radar.

On board ship, special problems occur with a search radar system of this type, due to the lurching movements of the ship in the sea. A search radar antenna is normally mounted to perform its scanning motion about a stationary axis in the ship, whereby the plane of rotation of the antenna, which normally is substantially parallel to the fore-and-aft axis and the athwart axis of the ship and thus horizontal when the ship is in the horizontal attitude, will participate in the lurching movements of the ship relative to the horizontal plane. Furthermore, the lobe of the antenna normally embraces a very small angle in the plane of rotation of the antenna, but a considerable angle in the plane perpendicular thereto, so that the lobe of the antenna has substantially the shape of a thin plate standing on its edge perpendicular to the plane of rotation of the antenna. When the ship, and thus the rotational plane of the antenna and the antenna lobe, are tilting relative to the horizontal plane, the antenna direction in which the antenna is receiving the echo from a certain target lying in the horizontal plane will consequently not correspond to the true bearing to the target in the horizontal plane. The bearing error evidently will vary with the magnitude of the lurch and with the angle between the direction to the target and the axis about which the ship is lurching; that is, the axis about which the rotational plane of the antenna is inclined relative to the horizontal plane.

The radar echoes from a target lying in a fixed bearing from the ship will consequently be received by the antenna in antenna directions which will vary with the lurching movements of the ship. As a result, the picture of the target on the display screen of the PPI scope and on the display screen of the offset-center PPI will move over the display screen in a direction corresponding to a change in the bearing to the target in step with the lurching movements of the ship. This makes it considerably more difficult for the operator to follow the target by means of the control means determining the position of the cut-out section in a manner such that the echo of the selected target is maintained in the center of the display screen of the offset-center PPI. Even if he is reasonably successful in his following effort, it is obvious that the data regarding the bearing to the selected target obtainable from the control means determining the position of the cut-out section will be incorrect, and due to the fact that the magnitude of the bearing error is continuously varying with the lurching movements of the ship, the computer will compute an erroneous speed for the target. This speed error in practice can become considerably larger than the true speed of the target.

To solve the above-mentioned problems, several different measures are conceivable. For instance, one can stabilize the antenna so that it will always rotate in a substantially horizontal plane independently of the lurching movements of the ship. Thus the picture on the PPI screen and the picture on the offset-center PPI screen will be stabilized, and the target-tracking equipment will directly give the correct value for the bearing to the target to be tracked. However, a device for completely stabilizing the rotational plane of an antenna is comparatively complicated and expensive.

Another possibility is to introduce into the signal path for the scanning motion of the antenna to the other parts of the radar system such a correction that the radar system is supplied with the direction of the antenna lobe in the horizontal plane, and not with its direction in the rotational plane of the antenna, which is tilting relative to the horizontal plane together with the ship. In this way the picture on the display screen of the PPI and that on the display screen of the offset-center PPI will be stabilized with respect to the lurching movements of the ship, and the target-tracking equipment will directly supply the true bearing to the target which is being tracked. A device for introducing the necessary correction in the signal path for the antenna rotation to the other parts of the radar system also is comparatively complicated and expensive.

A third possibility is to make a correction of the value for the bearing to the target being tracked as received from the target-tracking equipment, but not until this value has been transmitted to the fire control computer connected to the target-tracking equipment. The fire control computer can then operate with the true bearing to the target when computing the necessary data for the laying of a weapon. Such a device is comparatively simple, but neither the picture on the PPI scope of the radar system nor the picture on the offset-center PPI will be stabilized with respect to the lurching movements of the ship, and thus the operator will have difficulties in keeping the echo from the selected target exactly centered in the center of the display screen of the offset-center PPI.

The object of the present invention is to provide, in connection with a search radar system on a ship provided with target-tracking equipment of the type described above, a method and a device for effecting, in a simple manner and without any large amount of additional components, a correction of the value given by the target-tracking equipment for the bearing to the target being tracked so that this value will, independently of the lurching movements of the ship, correspond to the true bearing to the target.

The invention can be applied not only to a search radar system of the type in which the rotational plane of the antenna is stationary relative to the ship and parallel to the fore-and-aft and the athwart axes of the ship, but also to a radar system in which the rotational plane of the antenna participates only partially in the lurching movements of the ship, as, for instance, when the antenna is mounted on a platform which is tiltably mounted in the ship about an axis parallel to the fore-and-aft axis of the ship and is so stabilized that it participates only in the pitch movements of the ship, not in the roll movements.

The method according to the invention is fundamentally characterized by the fact that there is supplied to the deflection system of the offset-center PPI a voltage which is substantially proportional to the difference between the angle in the horizontal plane between the direction to a target visible on the display screen of the offset-center PPI and the inclination axis about which the rotational plane of the antenna is inclined relative to the horizontal plane, and the angle in the rotational plane of the antenna between the direction of the antenna, when it is receiving echoes from said target, and said inclination axis, in such a way that the voltage affects the deflection of the electron ray over the display screen of the offset-center PPI in the direction which represents the bearing angle within the cut-out section selected by means of the target-tracking equipment and presented on the display screen. In this way the picture of the cut-out section and the selected target lying within this cut-out section presented on the display screen of the offset-center PPI will not move laterally over the display screen when the ship is lurching. As a result, the operator will not be disturbed by the lurching movements of the ship when following the selected target. For a selected target having a fixed bearing to the ship, the echo from the target visible on the display screen of the offset-center PPI will consequently lie still in the center of the display screen, independently of the lurching movements of the ship, and the control means determining the position of the cut-out section will consequently give a constant value for the bearing to the selected target, corresponding to the true bearing to the target.

Other and further objects, features and advantages of the invention will be pointed out hereinafter and set forth in the appended claims constituting part of the application.

In the accompanying drawing a preferred embodiment of the invention is shown by way of illustration, and not by way of limitation.

In the drawing:

FIG. 1 is a graph diagrammatically illustrating the corrective system according to the invention for correcting bearing errors as caused by the lurching movements of a ship, and FIG. 2 is a circuit diagram of the correcting system according to the invention.

Referring first to FIG. 1, this figure shows schematically the relations between a horizontal plane H and the rotational plane D of the antenna, which tilts relative to the horizontal plane when the ship lurches, and between the direction of the antenna lobe in the rotational plane of the antenna and the direction of the antenna lobe in the horizontal plane. For the sake of lucidity the horizontal plane H and the rotational plane D of the antenna are represented in FIG. 1 by two intersecting diametrical planes in an imaginary sphere S enclosing the ship. All lines lying in the horizontal plane H are full lines, whereas those lying in the rotational plane of the antenna and inclined relative to the horizontal plane are dash-dot lines. O designates the intersecting line between the horizontal plane H and the rotational plane D of the antenna; that is, the axis about which the rotational plane of the antenna is for the moment inclined relative to the horizontal plane. If the rotational plane of the antenna is stationary relative to the ship and parallel with the fore-and-aft axis and the athwart axis of the ship, O will obviously also be the cant axis of the ship relative to the horizontal plane. The dotted lines are auxiliary lines, all perpendicular to the horizontal plane H. $N_1$ is normal to the horizontal plane H, intersecting this plane on the cant axis O, whereas $N_2$ is correspondingly normal to the rotational plane D of the antenna. The inclination angle between the rotational plane D of the antenna and the horizontal plane H is $\theta$ and corresponds to the cant angle of the ship, if the rotational plane of the antenna is stationary relative to the ship and parallel with the fore-and-aft axis and the athwart axis of the ship. L designates the direction in the rotational plane of the antenna which is parallel with the fore-and-aft plane of the ship, that is, a stationary plane in the ship which is perpendicular to the deck plane of the ship and contains the fore-and-aft axis of the ship, and will hereinafter be called the fore-and-aft antenna direction. T indicates the direction in the rotational plane of the antenna which is parallel to the athwart plane of the ship, that is, a stationary plane in the ship which is perpendicular to the deck plane of the ship and contains the athwart axis of the ship, and will hereinafter be called the athwart antenna direction. If the rotational plane of the antenna is stationary relative to the ship and parallel with the fore-and-aft axis and the athwart axis of the ship, that is, with the deck plane of the ship, the fore-and-aft antenna direction L is obviously parallel with the fore-and-aft axis of the ship, and the athwart antenna direction T is parallel with the athwart axis of the ship. The cross-hatched area A indicates the portion of the antenna lobe lying between the rotational plane of the antenna and the horizontal plane. $A_1$ indicates, consequently, the intersection line between the antenna lobe and the horizontal plane, whereas $A_2$ indicates the intersection line between the antenna lobe and the rotational plane of the antenna, and thus the antenna direction in the rotational plane. A target M lying in the horizontal plane on the line $A_1$ will consequently be discovered by the radar system when the antenna has the direction $A_2$ in the rotational plane, which is the only plane in which it is possible directly to measure the direction of the antenna. Due to the inclination of the rotational plane of the antenna relative to the horizontal plane when the ship is lurching, the antenna direction in which the antenna receives echoes from the target M consequently will not exactly correspond to the true direction in the horizontal plane to the target. The true bearing $A_1$ to the target M may be defined by the angle $\alpha$ in the horizontal plane between the direction to the target M and the cant axis O. In the same way the direction of the antenna in which the antenna is receiving echoes from the target M can be defined by the angle $\beta$ in the rotational plane of the antenna between the antenna direction $A_2$ and the cant axis O. The difference $\Delta$ between these two angles $\alpha$ and $\beta$ will represent the error in the bearing data for the target M from the radar system. The magnitude of this error obviously will vary with the magnitude of the inclination angle $\theta$ between the rotational plane of the antenna and the horizontal plane, and with the magnitude of the angle $\alpha$ between the true bearing to the target and the inclination axis O.

According to the invention, a voltage proportional to the difference $\Delta = \alpha - \beta$ is connected to the deflection system of the offset-center PPI in such a way that the voltage affects the deflection of the electron ray over the display screen of the offset-center PPI in the direction which represents the bearing angle within the cut-out section including the target M which is presented on the display screen of the offset-center PPI. In this way the echo from the target M, which is visible on the display screen of the offset-center PPI, will be stationary and will not move in step with the lurching movements of the rotational plane of the antenna. Consequently, the control means determining the position of the cut-out section will, independently of the inclination of the rotational plane of the antenna, give the same value for the bearing to the selected target M as when the rotational plane of the antenna is horizontal; that is, it will indicate the true bearing to the target M.

It can be shown that the bearing error $\Delta$ has the magnitude $$\Delta = \alpha - \arctan(\cos\theta \tan\alpha) \quad (1)$$

and the voltage connected to the deflection system of the offset-center PPI consequently is proportional to this expression, which could in principle be computed by means of a computer, for instance, an electronic digital computer, to which $\alpha$ and $\theta$ are supplied as input data. In practice, however, this is not immediately possible, partly because the computing of the Expression 1 given above requires a very large number of arithmetical operations in the computer, but primarily because the computer requires as input data the angle $\theta$, for which a value is not obtainable in a simple way, and also the angle $\alpha$ defining the true bearing to the target M, which is not yet known. It can be shown, however, that a very good approximation of the Expression 1 given above is the expression $$\Delta = \tfrac{1}{4}[2\theta_s \cdot \theta_r \cos(2\varphi) + (\theta^2_s - \theta^2_r)\sin(2\varphi)] \quad (2)$$

in which $\theta_s$ is the angle between the fore-and-aft antenna direction L and the horizontal plane, that is, the angle between the direction L and its projection $L_1$ in the horizontal plane: $\theta_r$ is the angle between the athwart antenna direction T and the projection $T_1$ of this direction in the horizontal plane, and $\varphi$ is the angle in the horizontal plane between the true bearing $A_1$ to the target M and the projection $T_1$ in the horizontal plane of the athwart antenna direction T. The Expression 2 can be computed in a computer by a comparatively small number of arithmetical operations, and hence according to the invention a voltage at least approximately proportional to this expression is connected to the deflection system of the offset-center PPI.

For the computation of the Expression 2 the computer requires a value for the angle $\varphi$ in the horizontal plane between the true bearing $A_1$ to the target M visible on the display screen of the offset-center PPI and the projection $T_1$ in the horizontal plane of the athwart antenna direction T, which angle is obviously not known. As a good approximation for this angle one can, however, according to the invention, use the angle $\varphi''$ in the rotational plane of the antenna between the antenna direction $A_2$, in which the antenna is receiving the echoes from the target M visible on the display screen of the offset-center PPI, and the athwart antenna direction T. The value of this angle $\varphi''$ can in principle be determined in the radar system. A still better approximation for the angle $\varphi$, however, can be obtained in a simple way from the radar system as the angle $\varphi'$, through which the cut-out section containing the selected target M and displayed on the display screen of the offset-center PPI is displaced by means of the control means from the direction which corresponds to the athwart antenna direction. A value dependent on this angle can obviously be directly picked out from the control means determining the position of the cut-out section. Since this value, in a device according to the invention, is corrected with respect to the lurching movements of the rotational plane of the antenna, it will give a very exact measure of the angle $\varphi$.

It is also not immediately possible to obtain exact values for the two angles $\theta_s$ and $\theta_r$. Very good approximations for these two angles, however, can be obtained by means of a vertical gyro, which is so mounted in two successive gimbals that it is affected by the lurching movements of the rotational plane of the antenna relative to the horizontal plane and that one gimbal axis is parallel with the fore-and-aft antenna direction and the other gimbal axis with the athwart antenna direction when the rotational plane of the antenna is horizontal. The angle of rotation $\theta_s'$ of the gimbal axis which is parallel with the athwart antenna direction—that is, the angle of rotation of the associated gimbal from the angular position of the axis when the rotational plane of the antenna is horizontal—will then approximately correspond to the angle $\theta_s$. In the same way the angle of rotation $\theta_r'$ for the other gimbal axis parallel with the fore-and-aft antenna direction from the angular position of the axis when the rotational plane of the antenna is horizontal will approximately correspond to the angle $\theta_r$. The angle of rotation for the gimbal axis of the inner gimbal, which is journaled in the outer gimbal, will then be exactly equal to the corresponding angle $\theta_s$ or $\theta_r$, respectively, whereas the angle of rotation of the gimbal axis of the outer gimbal, which is journaled in the rotational plane of the antenna, will be approximately equal to the corresponding angle $\theta_s$ or $\theta_r$, respectively. The approximation will be closest if the gimbal axis of the outer gimbal, which is journaled in the rotational plane of the antenna, is parallel with the fore-and-aft antenna direction, as the angle $\theta_s$ normally is smaller than the angle $\theta_r$.

As already mentioned, the inclination axis O will be identical with the cant axis of the ship relative to the horizontal plane if the rotational plane of the antenna is stationary in the ship and substantially parallel with the fore-and-aft axis and the athwart axis of the ship so that the angle $\theta$ will be identical with the cant angle of the ship relative to the horizontal plane, the direction L will be identical with the direction of the fore-and-aft axis of the ship, and the direction T will be identical with the direction of the athwart axis of the ship. As a result, the vertical gyro can in this case be mounted directly in the ship with one gimbal axis parallel with the fore-and-aft axis of the ship and the other gimbal axis parallel with the athwart axis of the ship when the ship is in the horizontal position.

When the antenna is mounted on a platform which is pivotable in the ship about an axis parallel with the fore-and-aft axis of the ship and so stabilized that it does not participate in the rolling motions of the ship but participates only in its pitching motions, the athwart antenna direction T—that is, the direction in the rotational plane of the antenna which is parallel to the athwart plane of the ship—will obviously always be horizontal so that $\theta_r$ is zero. The Expression 2 for the correction voltage which according to the invention is to be applied to the deflection system of the offset-center PPI is then reduced to $$\Delta = \frac{\theta_s^2}{4} \sin(2\varphi) \quad (3)$$

As in this case the fore-and-aft antenna direction L is parallel with the fore-and-aft axis of the ship, the vertical gyro can also in this case be mounted directly in the ship with one gimbal axis parallel with the fore-and-aft axis of the ship and the other gimbal axis parallel with the athwart axis when the ship is in the horizontal position. In this case, however, only the angle of rotation $\theta_s'$, approximately corresponding to the angle $\theta_s$, of the gimbal axis parallel with the athwart axis of the ship has to be supplied to the computer for the computation of the Expression 3 for the magnitude of the correction.

In the above Expressions 2 and 3 for the magnitude of the correction voltage, which according to the invention is to be applied to the deflection system of the offset-center PPI, the angle $\varphi$ has been used in the horizontal plane between the true bearing $A_1$ to the selected target M and the projection $T_1$ in the horizontal plane of the athwart antenna direction T. One can of course just as well use the angle $\mathfrak{I}$ in the horizontal plane between the true bearing $A_1$ to the target M and the projection $L_1$ in the horizontal plane of the fore-and-aft antenna direction L. For the magnitude of the correction $\Delta$ the above Expressions 2 and 3, respectively, are valid also in the case, but with opposite signs, as $\mathfrak{I} \approx 90° + \varphi$ and thus $$\sin(2\mathfrak{I}) \approx -\sin(2\varphi) \text{ and } \cos(2\mathfrak{I}) \approx -\cos(2\varphi)$$

The above Expressions 1, 2 and 3 for the magnitude of the necessary correction $\Delta$ obviously define the angle error. However, as the offset-center PPI normally is of a design such that the deflection of the electron ray over a certain length in the direction representing a change in the bearing to the target represents not a certain definite change in the bearing angle to the target, but instead a certain length displacement of the target in lateral direction, a deflection voltage obviously should be supplied to the offset-center PPI which is proportional to $l \cdot \Delta$, when $l$ is the range to the target. The range $l$ to the target is measured by the radar system, however, and can be supplied to the computer, which now can easily compute the quantity $l \cdot \Delta$.

A device for carrying out the method according to the invention in a search radar system provided with target-tracking equipment of the type previously described, in which the rotational plane of the antenna is stationary relative to the ship and substantially parallel with the fore-and-aft axis and the athwart axis of the ship, comprises a signal generator controlled by the control means determining the position of the cut-out section within the total scanned area for generating a signal to a computer, preferably an electronic digital control computer, which is dependent on the angle through which the selected cut-out section is displaced from the antenna direction parallel with the athwart plane of the ship. The system also comprises a gyro mounted in two successive gimbals in the ship in such a way that the two gimbal axes are parallel with the fore-and-aft axis and the athwart axis of the ship, respectively, when the ship is in a horizontal attitude, and signal generators coupled to the gimbal axes for generating signals to the computer corresponding to the angle of rotation of each gimbal axis relative to the angular position of the axis when the ship is in the horizontal attitude. The computer is arranged to compute on the basis of the supplied signal data the quantity $$\tfrac{1}{4}[2\theta_s'\theta_r' \cos(2\varphi') + (\theta_s'^2 - \theta_r'^2) \sin(2\varphi')]$$

in which $\theta_s'$ is the angle of rotation of the gimbal axis which is parallel with the athwart axis of the ship when the ship is in a horizontal attitude, $\theta_r'$ is the angle of rotation of the gimbal axis which is parallel with the fore-and-aft axis of the ship when the ship is in the horizontal attitude, and $\varphi'$ is the angle through which the cut-out section presented on the display screen of the offset-center PPI is displaced by means of the control means determining the position of the cut-out section from the antenna direction parallel with the athwart plane of the ship. A voltage proportional to the quantity computed by the computer is connected to the deflection system of the offset-center PPI so as to effect the deflection of the electron ray over the display screen in the direction representing the bearing angle within the cut-out section displayed on the offset-center PPI.

In a search radar system provided with target-tracking equipment of the type described, in which the radar antenna is mounted on a platform which is pivotable in the ship about an axis parallel with the fore-and-aft axis of the ship and so stabilized that it does not participate in the rolling motions of the ship but participates only in its pitching motions, the device according to the invention is modified in such a way that the computer is arranged to compute the quantity $$\frac{\theta_s'^2}{4} \sin(2\varphi')$$

and a voltage proportional to this quantity is connected to the deflection system of the offset-center PPI. In such system the angle of rotation of the gimbal axis parallel with the fore-and-aft axis of the ship does not have to be supplied to the computer for the computation of the correction quantity.

The radar system shown in FIG. 2 comprises in the conventional way a radar antenna 1, which is mounted on a platform 2 rotatable about an axis stationary in the ship in such a way that the antenna 1 rotates in a plane which is stationary relative to the ship and substantially parallel with the fore-and-aft axis and the athwart axis of the ship. The antenna 1 is connected to a conventional equipment 3 for transmitting radar pulses and receiving radar echoes from objects lying within the area scanned by the antenna 1. The received radar echoes are fed to the video input 4 of a conventional PPI-scope 5 and to the video input 6 of a so-called expanded offset-center PPI 7. Such an offset-center PPI produces, as is well known in the art, a substantially orthogonal range-bearing display substantially corresponding to the display produced by a B-scope. The scanning motion of the antenna is transferred in a suitable conventional manner, shown only schematically in the drawing, to one input shaft 8 of a differential gear D1, the output shaft 9 of which is coupled to the rotor of a conventional resolver R1. A resolver such as is suitable for the purposes of the invention comprises a stator and a rotor each having an iron core. The stator has two windings disposed on the core in a manner such that two mutually orthogonally oriented magnetic fields are generated when the two windings are connected to sources of alternating voltages. Similarly, the rotor has two windings disposed in a manner such that two mutually orthogonally oriented magnetic fields are generated when the rotor windings are excited by alternating voltages. The voltages induced in the rotor windings in response to an excitation of the stator windings will have different amplitudes, which are a function of the relative angle of rotation of the rotor in reference to the stator. Accordingly, the resolver will operate in the manner of a rotatable transformer.

The design and operation of resolvers suitable for use in the system of the invention are described in the textbook "Electromagnetic Components for Servomechanisms," by Sidney A. Davis and Byron K. Ledgerwood, pp. 162–182, published by McGraw-Hill, New York, 1962.

The rotor of the resolver R1 is rotated in step with the scanning rotation of the antenna 1. The other input shaft 10 of the differential gear D1 is coupled to a servomotor S1, which is controlled from a course gyro 11 of the ship in such a way that the shaft 10 of the servomotor S1 is rotated in accordance with any changes of the angle between the fore-and-aft axis of the ship and a fixed compass bearing, for instance, north. The mutual angle between the rotor and the stator of the resolver S1 consequently will always correspond to the momentary direction of the antenna 1 relative to the fixed compass bearing. A saw-tooth sweep voltage B having the same frequency as the pulse frequency of the radar transmitter 3 is supplied to a rotor winding of the resolver R1. The two stator windings of the resolver R1 are connected to the X-input and the Y-input 12, respectively, of the deflection system of the PPI5. In this way a radial sweep 13 is produced on the display screen of the PPI, which sweep will rotate in step with the antenna 1 and form an angle $\gamma$ relative to a fixed datum direction 14 on the display screen of the PPI corresponding to the angle between the momentary antenna direction and the fixed compass bearing. On this sweep the echoes from objects lying in the antenna direction corresponding to the sweep direction will appear as brilliant points or blips.

For the selection of a small cut-out section of the total area scanned by the antenna and displayed on the display screen of the PPI scope 5, the voltages from the two stator windings of resolver R1 are also connected to the stator windings of a conventional second resolver R2, the rotor of which is coupled to a shaft 16 rotatable by means of a crank 15. The voltages obtained from the rotor windings of the resolver R2 are connected to the X-input and the Y-input 19, respectively, of the deflection system of the offset-center PPI7 through adder circuits 17 and 18 respectively. The voltage connected to the X-input 19 of the offset-center PPI7 from one of the rotor windings of the resolver R2 is proportional to $B \sin(\gamma-\delta)$, where B is the momentary value of the sweep voltage B; $\gamma$ is the angle between the momentary antenna direction and the fixed compass bearing, and $\delta$ is the angle of rotation of the shaft 16 from a predetermined datum position. The voltage connected to the Y-input 19 of the deflection system of the offset-center PPI7 from the other rotor winding of the resolver R2 is proportional to $B \cos(\gamma-\delta)$. The sweep 13 which on the display screen of the PPI forms the angle $\delta$ with the reference direction 14 on the display screen of the PPI corresponding to the fixed compass bearing will consequently coincide with the Y-axis on the display screen of the offset-center PPI7. The deflection system of the offset-center PPI has such an amplification and comprises such bias voltages that only those sweeps which lie immediately adjacent the direction $\delta$ on both sides thereof will be visible on the display screen of the offset-center PPI. The bearing to the cut-out section displayed on the display screen of the offset-center PPI can consequently be determined by rotation of the shaft 16 by means of the crank 15. The deflection system of the offset-center PPI7 furthermore has such an amplification for the deflection in the Y direction that only a small portion of the total sweep 13 visible on the display screen of the PPI5 will be visible on the display screen of the offset-center PPI. The range to the portion of the sweep which is visible on the display screen of the offset-center PPI, and thus the range to the selected cut-out section displayed on the display screen of the offset-center PPI, can be determined by a potentiometer P1, which can be adjusted by means of a crank 20 coupled to a shaft 21. The voltage from the potentiometer P1, which is proportional to the rotation of the shaft 21, is connected to the Y-input 19 of the deflection system of the offset-center PPI7 through an adder circuit 17 and consequently will serve as a bias voltage for the Y-deflection and thus determine the distance to the cut-out section displayed on the display screen of the offset-center PPI. As the distance to the cut-out section is equal to the range $l$ to the selected target, provided the cut-out section is kept centered on the target, the voltage from the potentiometer P1 will be proportional to the range $l$ to the selected target.

The position of the cut-out section displayed on the display screen of the offset-center PPI7 is indicated on the display screen of the PPI5 by means of a marker 22, consisting for instance, of a circle, which is produced by means of deflection voltages generated by a marker generator 23 and connected to the deflection system of the PPI-scope through special marker input terminals 24. The deflection system is so designed that when only the deflection voltages from the marker generator are connected to the marker input terminals 24, the marker 22 produced by these deflection voltages will be situated in the center of the display screen of the PPI scope 5. For the displacement of the marker 22 over the display screen of the PPI-scope in accordance with the displacement of the cut-out section displayed on the display screen of the offset-center PPI7, the voltages from the two rotor windings of a resolver R3 are also connected to marker input terminals 24. The rotor of the resolver R3 is coupled to the shaft 16, and its stator winding is fed with the voltage from the potentiometer P1. The voltages connected to the marker input terminals 24 from the two rotor windings of the resolver R3 are consequently proportional to $l \sin \delta$ and $l \cos \delta$ respectively, and therefore the marker 22 on the display screen of the PPI5 will be disposed by the angle $\delta$ from the reference direction 14 and by the distance $l$ from the center of the display screen, and thus will indicate the bearing and the range to the cut-out section displayed on the display screen of the offset-center PPI7. As the resolver R3 can operate only with alternating voltages, the potentiometer P1 must be supplied with an alternating voltage so that it will generate an alternating voltage signal. The voltage proportional to $l \sin \delta$ and $l \cos \delta$ connected to the deflection system of the PPI5 and the voltage proportional to $l$ connected to the deflection system of the offset-center PPI must, however, be direct voltages. To provide such direct voltages, rectifiers 33, 34, 35 are connected to the output terminals from the resolver R3 and to one of the inputs of the adder circuit 17, respectively.

Consequently, an operator, guided by the picture and the marker 22 visible on the display screen of the PPI5, by means of the cranks 15 and 20 can move the cut-out section of the total scanned area, which section is displayed on the display screen of the offset-center PPI7, so that this cut-out section will encompass a certain target M which is to be followed. This target M will also be visible on the display screen of the offset-center PPI7, and the operator, guided by the picture on the display screen of the offset-center PPI, by means of the cranks 15 and 20, can now make a fine adjustment of the position of the cut-out section so that the echo from the selected target M will be disposed in the center of the display screen of the offset-center PPI7. Thereafter he can follow the target M with the cut-out section so that the target is kept centered on the display screen of the offset-center PPI7, whereby obviously the angle of rotation of the shaft 16 from a predetermined datum position will correspond to the angle measured by the radar station between the bearing to the selected target M and the fixed compass bearing, whereas the angle of rotation of the shaft 21 from a predetermined datum position will indicate the distance measured by the radar station to the selected target M. These values can be picked out from the radar system by means of signal generators (not shown in the drawing) connected to the shafts 16 and 21 and can be used as input data to, for instance, a fire control computer for a weapon which is to fire at the selected target M. Normally, in addition to the cranks 15 and 20 the operator also has other control means available for the fine adjustment of the cut-out section and for the tracking of the target—for instance, control means of the type described in U.S. patent application Ser. No. 368,837, filed May 20, 1964, now Patent No. 3,266,036.

However, as the plane of rotation of the antenna 1 is stationary relative to the ship and thus participates in the lurching movements of the ship, the antenna direction in which the antenna 1 receives echoes from the target will vary with the lurching movements of the ship, and consequently the picture of the total scanned area displayed on the display screen of the PPI-scope 5, as well as the picture of the cut-out section and the selected target M located therein and displayed on the display screen of the offset-center PPI7, will move in bearing to and fro in step with the lurching movements of the ship. When the operator is trying, by means of the cranks 15 and 20, to keep the echo from the selected target M, visible on the display screen of the offset-center PPI7, centered on the display screen, he must change the angle of rotation of the shaft 16, by means of the crank 15, in accordance with the lurching movements of the ship, even if the true bearing to the selected target M is not changing. The values for the bearing to the target, picked out from the shaft 16, will consequently include an error varying according to the lurching movements of the ship. Furthermore, the operator's task of following the selected target is made more difficult by the lateral movement of the target over the display screen of the offset-center PPI7.

In order to stabilize the picture of the selected target visible on the display screen of the offset-center PPI7 in bearing so that it will remain stationary, independently of the lurching movements of the ship, and so that consequently the angle of rotation of the shaft 16 will correspond to the true bearing to the selected target M, the radar system according to the invention is provided with a signal generator G1, which is coupled to the output shaft 25 of a differential gear D2. The one input shaft 26 of the differential gearing is coupled to the shaft 16 and consequently is rotated through an angle corresponding to the angle through which the selected cut-out section visible on the display screen of the offset-center PPI7 is displaced from the fixed compass bearing. The other input shaft 27 of the differential gear D2 is coupled to a servomotor S2, which is controlled from the course gyro 11 of the ship in such a way that it rotates the shaft 27 through an angle corresponding to the angle between the fixed compass bearing and the athwart axis of the ship. The output shaft 25 of the differential gear D2 consequently will have an angle of rotation corresponding to the angle through which the cut-out section visible on the display screen of the offset-center PPI7 is displaced from the direction corresponding to the athwart axis of the ship, and the signal generator G1 will generate a signal representing this angle $\varphi'$, which signal is connected to a computer 28, which may be of the digital or the analog type.

Furthermore, the system according to the invention comprises a vertical gyro 29, which is mounted in two successive gimbals 30 and 31. The outer gimbal 31 is journaled in the ship with its pivot axis parallel with the fore-and-aft axis of the ship, whereas the inner gimbal 30 is journaled in the outer gimbal 31 in such a way that its pivot axis is parallel with the athwart axis of the ship when the ship is in the horizontal attitude. A second signal generator G2 is coupled to the gimbal shaft of the outer gimbal 31 and generates a signal to the computer 28 representing the angle of rotation $\theta_r'$ of the gimbal shaft from the angular position assumed by the gimbal shaft when the ship is in its horizontal attitude. This angle of rotation will approximately correspond to the angle between the athwart axis of the ship and the horizontal plane. In the same way a third signal generator G3 is coupled to the gimbal shaft of the inner gimbal 30 and will generate a signal to the computer 28 representing the angle of rotation $\theta_s'$ of this gimbal shaft from the angular position of the gimbal shaft when the ship is in the horizontal attitude. The angle of rotation $\theta_s'$ of this gimbal shaft will exactly correspond to the angle between the fore-and-aft axis of the ship and the horizontal plane.

The computer 28 is preferably the computer in the fire control system governed from the radar station and may be an electronic digital computer, in which case the signal generators G1, G2 and G3 preferably are of the digital type and transmit to the computer 28 the values of the angles $\varphi'$, $\theta_r'$ and $\theta_s'$ in digital form. Furthermore, a signal from the radar station representing the range $l$ to the selected target M, for instance, from the potentiometer P1, or from a signal generator coupled to the shaft 21 is supplied to the computer in any conventional way, as indicated by a line in FIG. 2.

According to the invention the computer 28 is arranged to compute on the basis of the supplied input data the quantity $l \cdot \Delta'$, where $$\Delta' = \tfrac{1}{4}[2\theta_s'\theta_r' \cos(2\varphi') + (\theta_s'^2 - \theta_r'^2)\sin(2\varphi')]$$

and $l$ is the distance to the target M, and the value of this quantity is transferred in digital form to a digital-analog converter 32, which produces a voltage proportional to the computed quantity. This voltage is connected to the X-input terminal 19 of the deflection system of the offset-center PPI through the adder circuit 18 and consequently will affect the deflection of the electron ray in the X-direction on the display screen of the offset-center PPI, which direction represents the lateral distance within the cut-out section visible on the display screen of the offset-center PPI. As is obvious from what has been mentioned previously, this additional influence on the lateral deflection on the offset-center PPI will have the effect that the echo from the selected target M visible on the display screen of the offset-center PPI will become stabilized and will not move in lateral direction over the display screen in dependence on the lurching movements of the ship, and therefore the work of the operator is facilitated, and above all, the angle of rotation of the shaft 16 will correspond to the true bearing to the selected target M visible on the display screen of the offset-center PPI7.

The device according to the invention as shown in FIG. 2 and described above can also be used if the rotational plane of the antenna 1 is not completely stationary relative to the ship but participates only partially in the lurching movements of the ship. The only modification then necessary is that the vertical gyro must be mounted on the antenna platform, which participates only partially in the lurching movements of the ship, in such a way that the two gimbal axes, when the rotational plane of the antenna is horizontal, are parallel with the directions in the plane of rotation of the antenna which are parallel with the fore-and-aft plane and the athwart plane, respectively, of the ship.

In the particular instance in which the antenna platform is pivotally mounted in the ship about an axis parallel with the fore-and-aft axis of the ship and so stabilized that the antenna platform does not participate in the rolling motions of the ship but participates only in its pitching motions, the gyro may still be mounted directly in the ship in the manner described with reference to FIG. 2. In this case the signal generator G2 may be omitted, and only the value of the angle of rotation $\theta_s'$ for the gimbal shaft of the inner gimbal 30 need be transferred from the signal generator G3 to the computer 28, which is then arranged to compute and transfer to the digital-analog computer 32 the value of the quantity $l \cdot \Delta'$, where $$\Delta' = \tfrac{1}{4}\theta_s'^2 \sin(2\varphi')$$

The device shown in FIG. 2 and described above is to be regarded only as a possible embodiment of the invention; a device according to the invention can of course be realized in other ways and by means of other components. Thus, for instance, the signal generator G1 can be directly coupled to the shaft 16 which determines the bearing to the cut-out section visible on the offset-center PPI, whereby the signal generator will transmit to the computer 28 a signal representing the angle through which the cut-out section is displaced from the fixed compass bearing. In this case, information regarding the angle between the athwart axis of the ship and the fixed compass bearing can be transferred directly from the course gyro of the ship to the computer 28. The computer 28 is then arranged to compute on the basis of these data the value of the angle $\varphi'$ through which the visible cut-out section on the display screen of the offset-center PPI is displaced from the athwart axis of the ship before the computer computes the quantity $\Delta'$. Furthermore, it is unnecessary for the computer to compute the product $l \cdot \Delta'$; only the quantity $\Delta'$ need be computed, whereafter a voltage proportional to this quantity is supplied to a potentiometer coupled to the shaft 21. The output voltage of the potentiometer will consequently be proportional to $l \cdot \Delta'$ and can be connected to the offset-center PPI. The vertical gyro included in the device according to the invention preferably consists of the gyrostat normally present in the ship, from which the values of the angles $\theta_r'$ and $\theta_s'$ are normally already transferred to the fire control computer of the ship, to be used for the computation of the necessary data for the laying of the weapons of the ship. Consequently the invention requires a very small number of components in addition to those normally already present in a ship having a search radar system of the type here involved.

The circuit components referred to herein, such as the computers, resolvers, the PPI-scope and the offset-center PPI of the radar system should be visualized as conventional devices such as are readily available in the market. A suitable PPI-scope and a suitable offset-center PPI and suitable marker generators are described, for instance, in the following publications: "MIT Radiation Laboratory Series," Part 1, Ch. "Radar Indicators," pages 167–171; Part 22, Ch. "Radar Display," pages 17–22; and Part 22 Ch. "Electronic Markers and Indices," pages 227–250.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A target search radar system for use on a lurching ship having a fore-and-aft axis and an athwart axis, said axes intersecting to define a ship plane which intersects a fixed horizontal plane along a cant axis and rotates about said cant axis as said ship lurches and is substantially coincident with said fixed plane when said ship is in a horizontal attitude, said target search radar system comprising an antenna continuously rotatable through a substantial sector angle in said ship plane, means for transmitting signals to said antenna and receiving target echo signals therefrom so that a representation of the total area scanned by said antenna including targets is obtained, a means for displaying substantially orthogonal range and bearing coordinates including an election beam, means responsive to target echo signals for intensity-modulating said beam, a display screen and deflecting circuits for deflecting said beam across said display screen, selection means for selecting a cut-out section of the representation of the total scanned area, deflection drive means responsive to said selection means for transferring signals to said deflection circuits so that said display means displays only the selected cut-out section, and correction-generating means for generating a voltage which is related to the difference between the angle, in said fixed horizontal plane, between the direction to the target whose indication is visible on said display screen and said cant axis and the angle, in said ship plane, between the direction of said antenna when receiving the target echo signals displayed on said display screen and said cant axis.

2. The target search radar system of claim 1, wherein said correction-generating means includes a vertical gyro, and first and second successive gimbals for supporting said gyro, each of said gimbals having a shaft of rotation and a signal generator connected thereto for generating signals related to the rotation of the gimbal about its shaft of rotation, the shaft of rotation of one of said gimbals being parallel to said fore-and-aft axis and the shaft of rotation of said other gimbal being parallel to said athwart axis when said ship is in the horizontal attitude.

3. The target search radar system of claim 1, wherein said selection means includes means for generating signals representing the rotational position of said antenna at each instant of time and means for selecting portions of said signals.

4. The target search radar system of claim 3, wherein said selection means further includes means for generating signals proportional to target range.

5. The target search radar system of claim 1, wherein said selection means comprises a first resolver including an input shaft mechanically connected to said rotating antenna, a rotor winding adapted to receive a saw-tooth voltage and two stator windings, and a second resolver which includes two stator windings connected respectively to the stator windings of said first resolver, a rotor including rotor windings connected to the deflection circuits of said display means and a selectively rotatable shaft connected to said rotor for selecting the voltages transferred from said first resolver to said display means by said second resolver.

6. The target search radar system of claim 5, further including means for generating voltages proportional to the target range, and voltage adder means for adding voltages from the rotor windings of said second resolver to the voltages which are proportional to target range, and means for transmitting the summed voltages to the deflection circuits of said display means.

7. The target search radar system of claim 2, wherein said display means includes X-deflection circuits and Y-deflection circuits, and further comprising voltage generator means for generating a voltage related to the angle $\varphi'$ through which the bearing of the selected cut-out section is displaced from said athwart axis, a computer responsive to said voltage generator means and said gimbal signal generators for generating a correction voltage proportional to $$\tfrac{1}{4}[2\theta_s'\theta_r' \cos (2\varphi') + (\theta_s'^2 - \theta_r'^2) \sin (2\varphi')]$$

where $\theta_r'$ is the angle of rotation of the shaft of said one gimbal and $\theta_s'$ is the angle of rotation of the shaft of said other gimbal, and means for feeding said correction voltage to the X-deflection circuits of said display means.

8. The target search radar system of claim 7, wherein said voltage generator means includes a course gyro means for generating a signal related to the angle between a fixed compass bearing and said athwart axis, and said voltage generator means is responsive to said selection means so that the voltage representing the angle $\varphi'$ is related to said fixed compass bearing and the bearing of the selected cut-out section.

9. The target search radar system of claim 7, further including means for generating a range voltage proportional to the range of the selected cut-out section, and wherein said computer is further responsive to said latter means for generating a correction voltage proportional to $$\tfrac{1}{4}l[2\theta_s'\theta_r' \cos (2\varphi') + (\theta_s'^2 - \theta_r'^2) \sin (2\varphi')]$$

where $l$ is said range.

10. An error correction system for use with a target search radar system on a lurching ship which includes intersecting fore-and-aft and athwart axes, said axes defining a ship plane which intersects a fixed horizontal plane along a cant axis and rotates about said cant axis as said ship lurches and is substantially coincident with said fixed horizontal plane when said ship is in a horizontal attitude, said search radar system comprising an antenna mounted on a platform pivotable about an axis parallel with said fore-and-aft axis, said antenna continuously rotating through a substantial sector angle in the plane defined by said platform, means for transmitting signals to said antenna and receiving target echo signals therefrom so that a representation of the total area scanned by said antenna including targets is obtained, a means for displaying substantially orthogonal range and bearing coordinates including an intensity-modulated electron beam, a display screen and deflection circuits for deflecting said beam across said display screen, means for selecting a cut-out section of the representation of the total scanned area and transferring signals representing said selected cut-out section to the deflection circuits of said display means and means for feeding to said deflection circuits a voltage which is related to the angle between said fixed horizontal plane and said fore-and-aft axis.

11. The system according to claim 10, wherein said voltage is related to $$\tfrac{1}{4}\theta_s^2 \sin(2\varphi)$$

where: $\theta_s$ is the angle between said fixed horizontal plane and fore-and-aft axis; and $\varphi$ is the angle in said fixed horizontal plane between the direction to said target and said athwart axis.

12. The system according to claim 10, wherein said voltage fed to said deflection circuits is also proportional to the distance to said target.

13. A target search radar system for use on a lurching ship, said ship having a fore-and-aft axis and an athwart axis, said axes intersecting to define a ship plane which intersects a fixed horizontal plane along a cant axis and rotates about said cant axis as said ship lurches and is substantially coincident with said fixed plane when said ship is in a horizontal attitude, said target search radar comprising an antenna mounted on a platform pivotable about an axis parallel with said fore-and-aft axis, said antenna continuously rotating through a substantial sector angle in the plane defined by said platform, means for transmitting signals to said antenna and receiving target echo signals therefrom so that a representation of the total area scanned by said antenna including targets is obtained, a means for displaying substantially orthogonal range and bearing coordinates including an intensity-modulated electron beam, a display screen, and deflection circuits for deflecting said beam across said display screen, selection means for selecting a cut-out section of the representation of the total scanned area, deflection drive means responsive to said selection means for transferring signals representing said selected cut-out section to the deflection circuits of said means for displaying subtantially ortohgonal ranges and bearing coordinates so that said means for displaying substantially orthogonal range and bearing coordinates displays only the selected cut-out section, and correction generating means for additionally feeding to said deflection circuits correction voltages related to the angle between said fixed horizontal plane and said fore-and-aft axis.

14. The target search radar system of claim 13, wherein said correction-generating means includes a vertical gyro and at least one gimbal for supporting said gyro, said gimbal having a shaft of rotation and signal generator connected thereto for generating signals related to the rotation of said gimbal about its shaft of rotation, said shaft of rotation being parallel to said athwart axis when said ship is in the horizontal attitude.

15. The target search radar system of claim 14, wherein said correction-generating means includes means for generating a correction voltage which is proportional to $$\tfrac{1}{4}\theta_s'^2 \sin(2\varphi')$$

where $\theta_s'$ is the angle of rotation of said gimbal shaft and $\varphi'$ is the angle through which the bearing of the selected cut-out section is displaced from said athwart axis.

References Cited by the Examiner

UNITED STATES PATENTS

| | | | |
|---|---|---|---|
| 2,653,312 | 9/1953 | Haworth | 343—5 |
| 2,703,400 | 3/1955 | Gray et al. | 343—11 |
| 2,775,757 | 12/1956 | Ellsworth et al. | 343—5 |
| 3,078,455 | 2/1963 | Brainin | 343—7 |
| 3,155,964 | 11/1964 | Voles | 343—5 |

CHESTER L. JUSTUS, *Primary Examiner.*

P. M. HINDERSTEIN, R. D. BENNETT,
*Assistant Examiners.*